Patented Nov. 12, 1929

1,735,510

UNITED STATES PATENT OFFICE

LOUIS SHOSTAK, OF CHICAGO, ILLINOIS, ASSIGNOR OF ONE-HALF TO F. PETER DENGLER, INC., OF CHICAGO, ILLINOIS, A CORPORATION OF ILLINOIS

FOOD PRODUCT AND PROCESS OF MAKING SAME

No Drawing.    Application filed February 19, 1927. Serial No. 169,676.

This invention relates to improvements in food products and process of making same.

One of the features of my invention is to provide a food product that is pure, nourishing, wholesome, and also appetizing and delicious to the taste.

Other features and advantages of my invention will appear more fully as I proceed with my specification.

In the practice of my invention I select any desired cheese. Any kind of cheese may be taken; but obviously the kind of cheese will affect the resulting product. The original cheese taken may be of the Cheddar genus, granulated or not. I have found that full cream cheese containing from 20 to 30% of butter fat gives a very excellent resulting product; but obviously the original cheese selected may be skim cheese, or have more or less butter fat than the quantity mentioned.

I preferably add some water to the cheese, for example 1% to 3%, grind or otherwise reduce the same to a soft consistency and heat it until it melts. I have found, for example, that the melting may be accomplished by heating the cheese in a steam-heated container to a temperature of approximately 120° F. I preferably add an emulsifying agent, for example, about 1 to 3% sodium phosphate, and preferably hold the cheese in a melted condition for from thirty to forty minutes.

I then take 5 to 25% of chocolate, which may be sweet, bitter, or milk chocolate and cook the same to a boil. I preferably hold the chocolate at a slow boil from thirty to forty minutes.

I then mix the melted cheese and the melted chocolate and preferably heat the mixture to a temperature of from 140 to 200° F. and hold the same thus while stirring, for from thirty to fifty minutes in order to thoroughly mix and incorporate the cheese and chocolate. The resulting product is then put in containers and is ready for consumption.

Although I have described one way of making my improved food product, it is to be understood that variations may be made therefrom without departing from the spirit of my invention as specified in the claims, in which it is my intention to claim all novelty in my invention as broadly as possible, in view of the prior art.

What I claim as new and desire to secure by Letters Patent, is:

1. The process of making a food product comprising cheese and chocolate consisting of melting the cheese in the presence of an emulsifying agent, melting the chocolate, mixing the melted cheese and melted chocolate to thoroughly mingle the same, and molding the resulting mixture.

2. The process of making a mixture of cheese and chocolate comprising melting the cheese in the presence of water and an emulsifying agent, melting the chocolate, mixing the melted cheese and melted chocolate to thoroughly mingle the same, and molding the resulting product.

In witness whereof, I have hereunto set my hand this 14th day of February, A. D. 1927.

LOUIS SHOSTAK.